Figure 1:
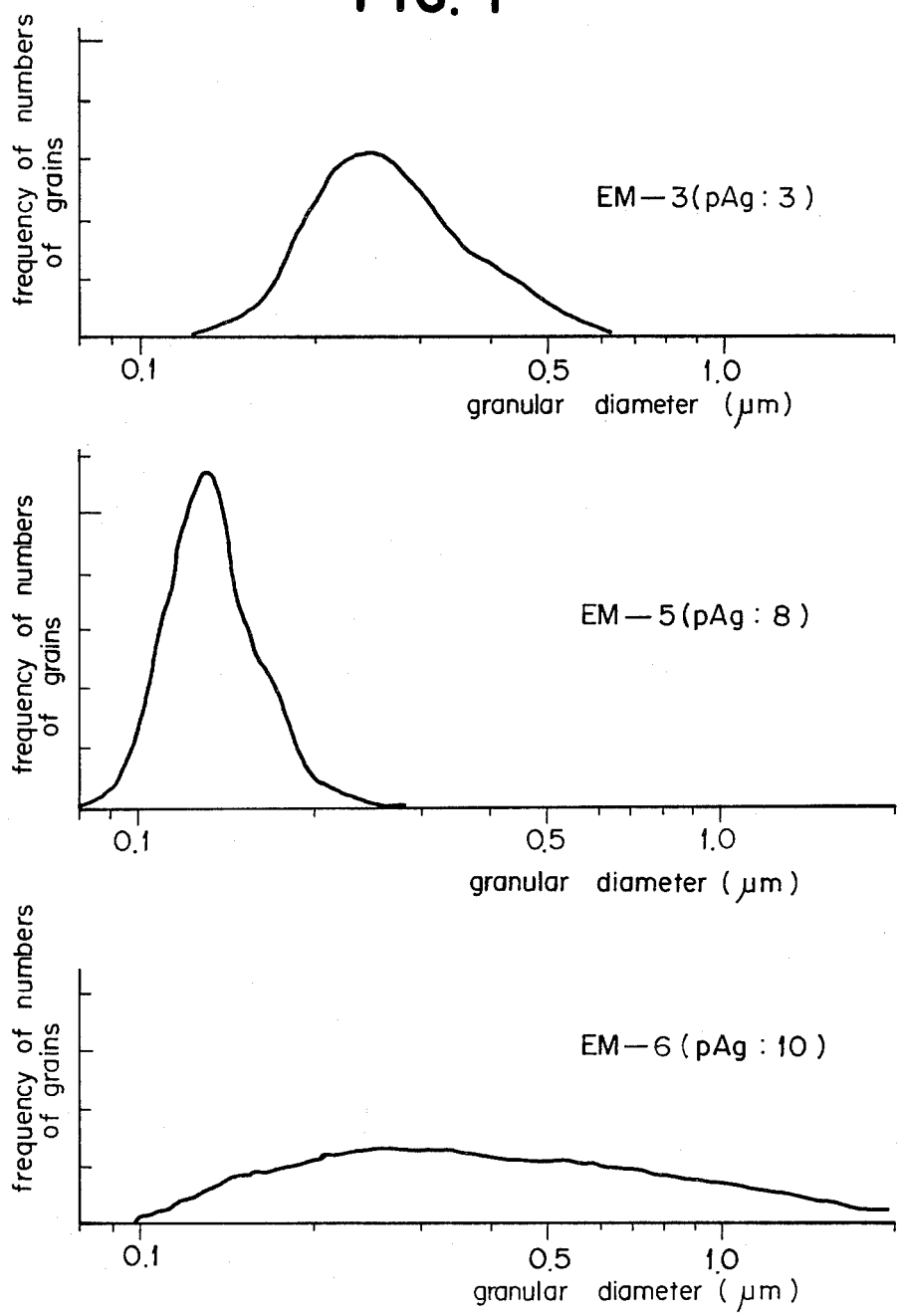

United States Patent [19]

Koitabashi et al.

[11] 4,349,622

[45] Sep. 14, 1982

[54] PHOTOGRAPHIC SILVER HALIDE EMULSION COMPRISING EPITAXIAL COMPOSITE SILVER HALIDE CRYSTALS, SILVER IODOBROMIDE EMULSION AND PROCESS FOR PREPARING THE SAME

[75] Inventors: Takeo Koitabashi; Syozi Matsuzaka; Tashifumi Iijima, all of Hino, Japan

[73] Assignee: Konishiroku Photo Industry Co., Ltd., Tokyo, Japan

[21] Appl. No.: 154,442

[22] Filed: May 29, 1980

[30] Foreign Application Priority Data

Jun. 1, 1979 [JP] Japan .................................. 54/69243
Jul. 19, 1979 [JP] Japan .................................. 54/92328
Feb. 7, 1980 [JP] Japan .................................. 55/14367

[51] Int. Cl.³ .............................................. G03C 1/02
[52] U.S. Cl. ................................... 430/567; 430/568; 430/569
[58] Field of Search ...................... 430/567, 568, 569

[56] References Cited

U.S. PATENT DOCUMENTS 4,094,684  6/1978  Maskasky .......................... 430/567
4,142,900  3/1979  Maskasky .......................... 430/567
4,150,994  4/1979  Maternaghan ..................... 430/569
4,184,878  1/1980  Maternaghan ..................... 430/569

*Primary Examiner*—J. Travis Brown
*Attorney, Agent, or Firm*—Frishauf, Holtz, Goodman & Woodward

[57] ABSTRACT

There are provided a photographic silver halide emulsion which comprises composite silver halide crystals consisting essentially of multi-faceted silver iodobromide crystals containing 15–40 mole % of silver iodide and silver halide crystals containing not more than 10 mole % of silver iodide, said silver halide crystals being combined as epitaxial silver halide crystals with said multi-faceted silver iodobromide crystals, at least half of the facetes of said multi-faceted crystals being substantially free of said epitaxial crystals and the amount of said epitaxial crystals being limited to not more than 75 mole % based on the total silver halide forming said composite crystals, a silver halide emulsion comprising silver halide grains consisting essentially of silver iodobromide containing 15–40 mole % of silver iodide substantially homogeneously distributed therein, and a process for preparing the same.

11 Claims, 2 Drawing Figures

PHOTOGRAPHIC SILVER HALIDE EMULSION COMPRISING EPITAXIAL COMPOSITE SILVER HALIDE CRYSTALS, SILVER IODOBROMIDE EMULSION AND PROCESS FOR PREPARING THE SAME

This invention relates to improvements in a photographic silver halide emulsion, to a silver iodobromide emulsion, and to a process for preparing the same. More particularly, this invention relates to a photographic silver halide emulsion comprising epitaxial composite silver halide crystals, to a silver halide emulsion comprising a silver halide composition consisting essentially of silver iodobromide containing silver iodide in a high concentration, and to a process for preparing the same.

It is heretofore known that two or more than two kinds of silver halides are employed in combination so as to make the best use of each of the constitutional silver halides combined in the structure of the single silver halide grain.

For instance, British Pat. No. 1,027,146 discloses composite silver halide grains which comprises silver halide nuclei (nuclear grains) coated with a single layer or multi-layers of silver halide. If silver chloride is caused to precipitate on a surface of silver bromide in the manner as described in the British patent, the spectral sensitivity of the silver bromide and the developing characteristics of the silver chloride are both given to the so obtained crystals.

U.S. Pat. No. 3,505,068 discloses an art comprising preparing a lower sensitive emulsion layer to be used together with a higher sensitive emulsion layer by applying the art disclosed in the British patent, and obtaining a lower contrast on a dye image by employing the so prepared emulsion layer. Silver halide grains employed in the lower sensitive emulsion layer comprise both of shells consisting of silver iodide or silver haloiodide and shells consisting of silver bromide, silver chloride or silver chlorobromide.

There has been recently developed a photographic silver halide emulsion containing composite silver halide crystals that are prepared through the epitaxial junctions of crystals of silver chloride or the like with crystals of silver iodide for combining the radiation-sensitivity of silver iodide and the rapid developability of silver chloride. The epitaxial composite silver halide crystals are composed of multi-faceted silver iodide crystals and silver chloride crystals formed on the multi-faceted crystals through epitaxial junction, as disclosed in Japanese Patent Provisional Publication No. 53(1978)-103725 (hereinafter, referred to as "Reference 1"). According to this disclosure, at least half of the facets of the silver iodide are substantially free of epitaxial silver chloride, and silver chloride is limited to not more than 75 mole %, based on the total silver halide forming the above-mentioned composite crystals. A photographic silver halide emulsion containing the epitaxial composite silver halide crystals is capable of liberating relatively large quantities of iodide ion upon development, and this enables achievement of preferred photographic effects by the libration of the iodide ion. These effects are considered to be great characteristics of the emulsion of that type. Other characteristics of the photographic silver halide emulsion reside in that the emulsion exhibits favorable interimage and edge effects; that the emulsion produces, upon development, a heterogeneous catalyst image, i.e. a silver image, for use in a redox amplification reaction; that photographic images, both silver and dye images, of reduced graininess and granularity are obtained; and, that the emulsion can be selectively developed so that silver chloride is developed or so that both silver chloride and silver iodide are developed. In the last way, development conditions can be selected to control the graininess and granularity of photographic images, control iodide ion liberation and control maximum image densities obtained.

However, a silver halide emulsion containing the composite silver halide crystals composed of the multi-faceted silver iodide and silver chloride formed on a part of the surfaces of the silver iodide crystals through epitaxial junction has drawbacks in that either of the developing speed or the fixing speed is low and that the treatment efficiency is low.

With reference to the art described in Reference 1, an art involving substitution of silver chloride formed on multi-faceted silver iodide crystals which serve as host crystals through epitaxial junction with silver bromide or the like by a conversion method is disclosed in U.S. Pat. No. 4,142,900 (hereinafter, referred to as "Reference 2"). This art deserves attention as an art for improving the developing speed by the use of silver halide crystals prepared through the epitaxial junction, and the art has a variety of the same advantageous aspects as stated with respect to the art of Reference 1. Nevertheless, the art disclosed in Reference 2 is not free from the drawbacks of the composite silver halide emulsion stated in the above. In a reasonable consequence, silver iodobromide crystals containing a high concentration of silver iodide is expected to be favorably employed as the host crystals of epitaxial composite silver halide crystals in place of the silver iodide crystals.

Moreover, apart from the application to the epitaxial composite silver halide emulsion, a silver iodobromide emulsion containing homogeneously a high concentration of silver iodide, particularly a monodispersed emulsion, may be assumed favorable in providing improvements on the interimage and edge effects that are observed when a high-sensitive black-and-white negative film, an X-ray film for medical use, a multi-layer color negative film, and the like are employed, or improvements of the performances observed in the triger method.

There have hitherto been disclosed a number of processes for preparing silver iodobromide emulsions. However, the previously known processes can provide a silver iodobromide emulsion containing silver iodide in an amount of at most about 12 mole %, as far as the emulsion is required to be kept under the conditions that the silver iodide is to be homogeneously distributed in or between the silver halide grains. There is known no process for preparing a silver iodobromide emulsion containing homogeneously silver iodide in an amount above that level.

There can be cited, as a previously known process, a process disclosed in Photographic Science and Technique, [II] 2, pp. 149-153 (1955), which involves the addition of an aqueous silver salt solution to an aqueous solution containing potassium bromide, potassium iodide and a protective colloid. According to this process, however, silver bromide grains and silver iodobromide grains comprising a lower level of silver iodide are formed, as well as silver iodobromide grains comprising silver iodide of about 40 mole %.

There can be also cited a process disclosed in J. Phys. Chem., Vol. 62, pp. 881-882 (1958), which involves adding simultaneously an aqueous halide solution and an aqueous silver salt solution to an aqueous protective colloid solution so as to prepare a silver iodobromide emulsion. According to this process, however, the upper limit of the silver iodide content in an obtained silver iodobromide emulsion consisting of a homogeneous single phase of silver iodobromide grains is at most about 12 mole %. If a procedure is applied to increase the silver iodide content beyond that upper limit, a mixture of silver iodobromide grain having different silver iodide concentrations is produced in an emulsion obtained. Thus, a silver iodobromide containing homogeneously silver iodide in a higher concentration cannot be prepared by any previously known process.

Accordingly, it has been desired to provide a silver iodobromide emulsion containing silver iodide in a higher concentration and in a homogeneous state which serves as host crystals for preparing epitaxial composite silver halide crystals. Moreover, a photographic emulsion of that type containing silver halide grains whose grain distribution belongs to "monodispersed" phase is expected to be of great value. The term "monodispersed" employed herein is as defined in Illingsworth U.S. Pat. No. 3,501,305, issued Mar. 17, 1970.

Accordingly, it is a primary object of the present invention to provide a photographic silver halide emulsion comprising epitaxial composite silver halide crystals which is free from the technical drawbacks of the arts disclosed in the aforementioned Reference 1 and Reference 2, and which is faster in the developing speed and fixing speed.

It is the second object of this invention to provide a silver halide emulsion comprising silver halide crystals useful as host crystals for obtaining epitaxial composite silver halide crystals, the use of which improves the developing speed and fixing speed of photographic materials comprising the epitaxial composite silver halide crystals.

It is the third object of this invention to provide a silver halide emulsion comprising a silver iodobromide emulsion which can be used for other applications than that for the host crystals of the epitaxial composite silver halide crystals.

It is the fourth object of this invention to provide a process for preparing a silver iodobromide emulsion containing homogeneously a higher concentration of silver iodide.

Other object of this invention will be apparent from the following disclosure.

The above-described primary object and other objects hereinafter described which are contemplated by the present invention can be accomplished by a photographic silver halide emulsion which comprises composite silver halide crystals consisting essentially of multi-faceted silver iodobromide crystals containing 15-40 mole % of silver iodide and silver halide crystals containing not more than 10 mole % of silver iodide, said silver halide crystals being combined as epitaxial silver halide crystals with said multi-faceted silver iodobromide crystals through epitaxial junction, at least half of the facetes of said multi-faceted silver iodobromide crystals being substantially free of said epitaxial silver halide crystals, and the amount of said epitaxial silver halide being limited to not more than 75 mole % based on the total silver halide forming said composite silver halide crystals.

In the present specification and claims, the term "epitaxy" is used to signify the same meaning as described in both of References 1 and 2, that is, the term "epitaxy" means that the crystal orientation of silver halide atoms such as silver chloride, silver chlorobromide, silver iodobromide, or the like which is deposited on a host crystal (silver iodobromide crystal) is controlled during its growth by the silver iodobromide host crystal. The epitaxial relationship between the epitaxial silver halide such as silver chloride, silver chlorobromide, silver iodobromide, silver chloroiodobromide or the like in the composite crystal and the silver halide portion serving as the silver iodobromide host crystal is entirely different from the direct physical contact in other crystals of silver iodide, silver chloride, silver iodobromide, silver chlorobromide, or the like.

One of the main characteristics of the present invention lies in that the host crystals are the multi-faceted silver iodobromide crystals containing homogeneously silver iodide. The employment of the so formed silver iodobromide crystals as the host silver halide crystals can bring about increase of the developing speed and fixing speed with no substantial lowering of the photosensitivity and image qualities such as granularity and sharpness after processing, of the silver halide emulsion comprising composite silver halide crystals.

In addition to the above-described advantageous aspect, when a photographic material which is prepared by application of a silver halide emulsion of the present invention is employed, the amount of iodide ion to be liberated during developing process can be easily controlled.

Accordingly, control of the interimage and edge effect can be made easy; and application to the redox amplification process can be made advantageous.

The silver iodobromide employed as the host crystals in the present invention is multi-faceted radiation-sensitive silver iodobromide, having at least $0.1\mu$ of the mean granular diameter. The present multi-faceted silver iodobromide crystals have substantially homogeneous compositions. These crystals of silver iodobromide can be formed by the process which will be described hereinafter in detail.

The composite silver halide crystals employed in the present invention are prepared by depositing silver halide crystals containing not higher than 10 mole % of silver iodide on the above-mentioned multi-faceted silver iodobromide crystals.

The formation of the silver halide crystals having the crystal structure combined through the epitaxial junction can be done, for instance, by the following processes.

[A] A solution containing a water-soluble halide and a silver salt solution are simultaneously added to the multi-faceted silver iodobromide crystals so that crystals of silver chloride, silver chlorobromide, silver iodobromide, silver chloroiodobromide or the like are deposited through the epitaxial junction.

[B] Silver halide crystals are deposited on multi-faceted silver iodobromide crystals through the epitaxial junction, and on the so obtained silver halide crystals are subsequently deposited crystals of silver bromide, silver chloroiodobromide, silver iodobromide or the like by the simultaneous addition of a colloidal solution containing a water-soluble chloride, a water-soluble bromide, a water-soluble iodide or the like and a silver salt solution.

[C] Crystals of silver chlorobromide, silver chloroiodobromide, silver iodobromide or the like are deposited on multi-faceted silver iodobromide crystals through epitaxial junction by applying the conversion method stated in Reference 2.

[D] A solution containing a water-soluble chloride, a water-soluble bromide, a water-soluble iodide or the like is added to a solution containing multi-faceted silver iodobromide crystals (host crystals), a water-soluble silver salt and a protective colloid by the single jet method to deposit crystals of silver chloride, silver chlorobromide, silver iodobromide, silver chloroiodobromide or the like through the epitaxial junction.

Moreover, at least half of the facets of the multi-faceted silver iodobromide crystals are substantially free of the epitaxial silver halide, and the epitaxial silver halide is limited to not more than 75 mole %, based on the total silver halide forming the composite crystals.

The photograpic emulsion of the present invention shows preferred interimage and edge effects. When a photographic material comprises, for instance, a photographic emulsion layer provided by the present invention, an iodide ion liberated during development process can be employed for deactivating the surface of a heterogeneous catalyst which is used for the redox amplification reaction between an oxidizing agent such as cobalt hexamine or hydrogen peroxide and a reducing agent for forming dye image such as a color developing agent or a redox color releasing agent used together with an electron transferring agent.

The photographic emulsion of the present invention can be coated and dried on an appropriate support to prepare a silver halide emulsion layer, exposed imagewise by radiation of visible spectral ray and developed under an appropriate developing condition to yield a photographic silver image. Further, an iodide ion liberated during development can be utilized, even under the redox amplification reaction conditions, for deactivating a silver image serving a redox amplification catalyst.

The photographic emulsion of the present invention can contain a dye forming coupler so that both of a photographic silver image and a photographic dye image can be obtained. In addition to the above-mentioned effect, the so obtained images are advantageous in that the grainess and granularity are at lower levels.

Moreover, the photographic emulsion of the present invention can be subjected to the selective development process, that is, the photographic emulsion can be so developed as to develop the epitaxial silver halide only, or can be so developed as to develop both of the epitaxial silver halide and silver iodobromide. Accordingly, the photographic emulsion of the present invention can provide a number of advantageous aspects, that is, the grainess and granularity of a photographic image can be controlled; the liberation of an iodide ion can be controlled; a development condition for controlling the maximum density of the obtained image can be selected; or the like.

The present invention is further described hereinafter.

The photographic emulsion of the present invention comprises composite crystals consisting of silver iodobromide containing 15-40 mole % of silver iodide and silver halide containing not higher than 10 mole % of silver iodide. The host crystals consists of silver iodobromide having a homogeneous composition. The silver iodobromide crystals constituting the host crystals have the same sensitivity as the silver iodide crystals disclosed in References 1 and 2, and the silver iodobromide crystals comprised in the emulsion of the present invention preferably have the mean granular diameter of at least $0.2\mu$. The second portion of each of the composite crystals, that is a portion formed on facets of the multi-faceted silver iodobromide crystals through epitaxial junction, are a silver halide crystal such as silver chloride, silver chlorobromide, silver iodobromide, silver chloroiodobromide or the like containing not higher than 10 mole % of silver iodide.

In the epitaxial composite crystals employed for the present invention, the silver iodobromide crystal serves as the first radiation-receptor. If the photographic emulsion containing composite crystals of the present invention are exposed imagewise to a blue light, a developable latent image is formed. If the epitaxial composite crystals comprising silver iodobromide host crystals and crystals of silver chloride, silver chlorobromide, silver iodobromide or silver chloroiodobromide deposited on the host crystals through epitaxial junction are exposed, the whole portions of the composite silver halide crystals are made developable. Nevertheless, only the epitaxial silver halide portion can be likewise developed.

The composite crystals employed for the present invention are crystals in which at least half of the facets of the multi-faceted silver iodobromide crystals are free of the epitaxial silver halide and the epitaxial silver halide is limited to not more than 75 mole % based on the total silver halide forming the composite crystals. If the ratio of the epitaxial silver halide exceeds 75 mole %, a facet of silver iodobromide crystal on which epitaxial silver halide is to grow through epitaxial junction is eroded by a crystal structure of epitaxial silver halide deposited on a facet of silver iodobromide crystal being adjacent thereto.

The epitaxial silver halide portion of the composite crystal used for the present invention does not serve as the first radiation receptor in the composite crystal. Accordingly, a photographic speed of the photographic emulsion of the present invention is not predominently controlled by radiation given to the epitaxial silver halide.

The amount of epitaxial silver halide in the composite crystals used for the present invention preferably ranges from 1 to 50 mole % based on the total composite silver halide, and more preferably is not less than 5 mole %. The epitaxial silver halide has effect to accelerate the initial developing speed.

The optimum amount and composition of the epitaxial silver halide used for the present invention can be selected according to a purpose of the photographic emulsion of the present invention. For instance, if characteristics in which the exposure level to radiation is high and the developing speed is high are required, the epitaxial silver halide at a higher ratio is employed, as compared with a case in which lower exposure level to radiation and lower developing speed are required. If an improvement on the storage stability of the composite silver halide emulsion is particularly intended, epitaxial silver halide containing silver bromide or silver iodide is employed. If the emulsion is to be subjected to a combined developing, bleaching and fixing treatment, an epitaxial silver halide composition is optionally selected so that the balance among the developing speed, the bleaching speed and the fixing speed can be advantageously controlled.

The sizes of the epitaxial silver halide crystals can be so selected that the silver iodobromide host crystals cannot be developed, but that the epitaxial silver halide only can be developed. In this case, the graines and granularity of the photographic image are defined by the sizes (diameters) of the epitaxial silver halide crystals, as far as the solution physical development does not take place. The photographic speed is defined by the sizes of the silver iodobromide host crystals which have larger diameter than the epitaxial silver halide crystals.

The epitaxial composite silver halide crystal used for the present invention is a sole silver halide crystal (grain). The composite crystals may be either monodispersed or polydispersed. The term "monodispersed" employed herein is as defined in Illingsworth, U.S. Pat. No. 3,501,305. Namely, the crystals are considered to be monodispersed when at least 95% by weight or by number of the composite silver halide crystals are within 40% of the mean diameter of the silver halide crystals. The relative advantages of monodispersed and polydispersed emulsions, for instance, monodispersed emulsions exhibit higher contrast than corresponding polydispersed emulsions, are generally well understood in the art related.

The epitaxial silver halide crystal employed for the present invention makes the composite crystals reactive to the surface development, as far as the crystal form is not changed in the course of the formation. Namely, the photographic emulsion of the present invention can be developed in a surface developing solution after image-wise exposure. The surface developing solution contain substantially no soluble iodide salt and silver halide solvent and can initiate development of a latent image being present on the facet of the silver halide crystal.

The composite crystals employed for the present invention can be so formed that a latent image can be made present inside of the crystal structure rather than present on the crystal structure facets upon exposure. In other words, the epitaxial composite silver halide crystals included in the present invention can be so formed as to become crystals for forming an internal latent image predominantly. To predispose the composite crystals form an internal latent image, an internal dopant can be incorporated into the epitaxial silver halide crystal. Examples of the internal dopant include silver, sulfur, iridium, gold, platinum, osmium, rhodium, tellurium, selenium, etc. The photographic emulsion containing the composite crystals according to the present invention can be developed, for instance, with an internal developing solution containing a silver halide solvent or a soluble iodide. When the composite crystals for forming predominently an internal latent image are prepared, the epitaxial silver halide crystals are formed in the presence of, for instance, a non-silver metal ion, preferably a polyvalent metal ion. The epitaxial silver halide crystals are preferably formed in the presence of the water-soluble salts of the respective metal, most preferably in an acidic medium. Referred examples of the polyvalent metal ions include divalent metal ions such as lead ions, trivalent metal ions such as antimony, bismuth, arsenic, gold, iridium, rhodium and the like and tetravalent metal ions such as iridium and the like. Particularly preferred polyvalent metal ions to be employed are iridium, bismuth and lead ions. The epitaxial silver halide crystals generally contain at least $10^{-9}$ mole %, preferably at least $10^{-6}$ mole % of the internal dopant based on the epitaxial silver halide. The dopants are generally present in the epitaxial silver halide grain in a concentration of less than about $10^{-1}$ mole, preferably $10^{-4}$ mole, per mole of epitaxial silver halide.

The composite crystals employed for the present invention can be prepared by depositing epitaxial silver halide crystal on facets of multi-faceted silver iodobromide crystals serving as the host crystals, for instance, in one of the manners [A], [B], [C] and [D] described hereinbefore.

The photographic silver halide emulsion of the present invention can be blended with other emulsions to adjust so as to obtain a specified photographic characteristics. This procedure enables control of both of the photographic sensitivity and contrast. If the photographic silver halide emulsion of the present invention comprises the composite crystals specified by the present invention and other silver halide crystals blended therewith and if the composite crystals occupy at least 50% by weight of the total silver halide crystals, the composite crystals mainly perticipate in the formation of image. Even though the amount of the composite crystals is less than 50% by weight, the interimage effect and edge effect can be effectively controlled.

In the photographic emulsion of the present invention, the composite crystals specified by the present invention can be blended with silver chloride crystals. An advantageous aspect of the incorporation of silver chloride crystals lies in that the developing speed and/or the silver image density can be substantially enhanced due to the physical development of the silver chloride crystals, even though the silver chloride crystals are not developed chemically or directly under the conditions specified for exposure and development. The ratio for blending the composite silver halide crystals specified by the present invention with the silver chloride crystals can be optionally selected depending upon the purpose. If a prominent effect is desired to achieve in the solution physical development, 1-50% by weight, particularly 5-50% by weight, of the total silver halide content is preferably occupied by the silver chloride blended with the composite crystals specified by the present invention.

A photographic emulsion of the present invention can be coated on an appropriate support to provide a photographic silver halide photosensitive material. Into a photographic emulsion of the present invention or a photographic photosensitive material, a variety of photographic additives can be incorporated in the manners described in References 1 and 2. There can be incorporated, for instance, a sensitizing dye, coupler, development controlling agent, antifoggant, stabilizer, developing agent, film hardening agent, antistatic agent, plasticizer, lubricating agent, bleaching agent, ultra violet absorber, antihalation dye, and filter dye, as desired.

A photographic emulsion of the present invention is advantageously applied to a variety of light-sensitive silver halide photographic materials such as those for X-ray, color, black-and-white, transfer process, high contrast photography and photothermography.

The photographic silver halide emulsion of the present invention can be chemically sensitized in a conventional manner. Applicable chemical sensitizing agents and examples of preferred sensitizing processes are described in References 1 and 2. Further, examples of development processes for a photographic photosensitive material employing the photographic emulsion of the present invention are described in References 1 and 2. For instance, the light-sensitive silver halide photographic material can be processed through a conventional physical development process or can be subjected to a transfer process generally employed, such as the colloid transfer process, silver salt diffusion transfer process, inhibition transfer process, color transfer process, etc.

For developing the epitaxial silver halide crystals only or both of the epitaxial crystals and the silver iodobromide host crystals comprised in the composite crystals in the photographic emulsion of the present invention, selection of a developing agent and a simple control of the developing conditions are required. The use of a powerful developing agent such as hydroquinone, catechol, Phenidone, or the like gives the complete development of the composite silver halide crystals. Likewise, a color developing agent such as aminophenol or p-phenylenediamine can be used together with a dye forming coupler to provide a substantially complete development of the composite silver halide crystals. In contrast to the above, the color developing agent is used for development in the absence of the color forming coupler to develop selectively the epitaxial silver halide crystals only. This is because the development begins on silver chloride, silver chlorobromide, silver iodobromide or silver chloroiodobromide. If the developing speed is made relatively slow and the stirring is not done, the development terminates after substantial completion of development of the epitaxial crystals but prior to initiation of development of a large portion of the silver iodobromide host crystals. The amount of iodide ions liberated during development can be controlled.

The photographic emulsion of the present invention is advantageously applicable to a redox amplification process requiring a heterogeneous catalyst for enabling the reaction between an oxidizing agent and a reducing agent. Examples of the oxidizing agent and reducing agent and concrete procedures are described in References 1 and 2. The photographic emulsion of the present invention can be applied to a thermosensitive light-sensitive photographic material, as described in these References.

A light-sensitive silver halide photographic material utilizing the photographic emulsion of the present invention can be subjected to a combined developing, bleaching and fixing treatment, and a dye-image reinforcing treatment disclosed in Japanese Patent Provisional Publications Nos. 52(1977)-20025 and 52(1977)-30430, and Japanese Patent Applications Nos. 53(1978)-33326, 53(1978)-45150, 53(1978)-70053, and 33326, 53(1978)-70056.

The second and third objects of the present invention are accomplished by a silver halide emulsion comprising silver halide grains consisting essentially of silver iodobromide containing 15-40 mole % of silver iodide substantially homogeneously distributed therein.

The term "silver halide grains consisting essentially of silver iodobromide containing silver iodide substantially homogeneously distributed therein" used herein means that the half-width of a peak corresponding to the index of the plane (200) of a silver iodobromide obtained by an X-ray diffraction analysis of the silver halide powder using Cu-Kα X-ray is not higher than $\Delta 2\theta = 0.30$ (deg.). When the measurement is carried out, the deffractometer is operated under conditions corresponding to $\omega\tau/\gamma \leq 10$ in which $\omega$ (deg./min.) means a scanning speed of the goniometer, $\tau$ (sec.) means a time constant, and $\gamma$ (mm) means a receiving slit width. For the purpose of obtaining description on the measurement conditions for an X-ray diffraction analysis more in detail, reference is made to "Introduction of X-ray Diffraction Analysis" published by Rigaku Denki Co., Ltd., Japan, pp. 45-47 (1968) and "X-ray Crystallography", edited by Isamu Nitta, and published by Maruzen Co., Ltd., Japan, Volume One, pp. 293-297 (1959).

The silver halide emulsion of the present invention includes emulsions containing silver halide grains that show measurement data within the above-mentioned range upon measurement by the X-ray diffraction analysis. The term "measurement data within the above-mentioned range" is intended to include the data showing two or more than two peaks, of which half-widths given by the diffraction from the (200) plane are not higher than 0.30 (deg.).

Examples of a silver halide emulsion showing the above-described measurement data include an emulsion obtained by mixing two or more than two emulsions containing silver halide grains consisting essentially of silver iodobromide containing 15-40 mole % of silver iodide substantially homogeneously therein, but being different from each other in the silver iodide content in the silver iodobromide, and a silver halide emulsion comprising two kinds of silver halide grains consisting essentially of silver iodobromide containing 15-40 mole % of silver iodide substantially homogeneously therein, but being different from each other in the silver iodide content in the silver iodobromide, in which one kind of crystal is coated on another kind of crystal.

The silver halide grain comprised in the emulsion of the present invention essentially is a phase consisting of silver iodobromide containing 15-40 mole % of silver iodide substantially homogeneously distributed therein. The term "consisting essentially of silver iodobromide" used herein means to include silver iodobromide containing constituents other than the silver iodobromide such as silver chloride, so far as the level of the contained constituents are not detrimental to the characteristics of the silver iodobromide serving as principal constituent. If the constituent other than silver iodobromide is silver chloride, the amount of silver chloride contained therein preferably is not more than 0.5 mole %.

The fourth object and other objects which will be described hereinafter are realized by preparing a silver halide emulsion having a silver halide composition consisting essentially of silver iodobromide containing 15-40 mole % of silver iodide, in which the silver halide is produced from a solution containing a protective colloid, by keeping the pAg of the solution in the range of 1-8 during the period of production of the silver halide.

In practising the present invention, the production of a silver halide from a solution containing a protective colloid under the pAg conditions defined as above is advantageously realized by simultaneous addition of both of a solution comprising a water-soluble bromide and a water-soluble iodide and a solution containing a water-soluble silver salt to a solution containing a protective colloid in a simultaneous mixing way. The pAg value is preferably maintained at a certain value within the range of 1-8, and it is preferred not to vary the pAg value suddenly.

A protective colloid employed in the process of the present invention can be selected from a group of the protective colloids generally employed for preparing a silver halide emulsion. As a protective colloid is advantageously employed a colloid made from gelatin. Other types of hydrophilic colloids, however, can be employed as well.

The amount of the protective colloid to be included ranges from about 0.5 g to about 100 g., per one liter of a solution (emulsion) containing the produced silver halide.

The water-soluble bromide, iodide and silver salt employed in the process of the present invention can be selected from those generally used in a convention silver halide emulsion. Examples of the water-soluble bromide include potassium bromide and sodium bromide; examples of the water-soluble iodide include potassium iodide and sodium iodide; and examples of the water-soluble silver salt include silver nitrate.

Apart from the conditions on the pAg during production of silver halide, there are no other limitations on conditions such as pH value and temperature. However, the pH value preferably is within the range from about 2 to about 9, more preferably is not higher than 5, and particularly preferably is not higher than 3. The temperature favorably is within the range from about 30° C. to about 90° C., and preferably is within the range from 35° C. to 80° C. Under the same pAg value conditions, a higher temperature can provide silver halide grains of narrower granularity distribution. The pH value and the temperature may be varied during production of silver halide grains but these are preferably kept at constant levels during the production.

For carrying out the process for preparing silver halide grains to be employed for the process of the present invention, reference may be made to, besides the above mentioned references, U.S. Pat. No. 2,222,264, U.S. Pat. No. 2,592,250, U.S. Pat. No. 3,206,313, U.S. Pat. No. 3,447,927, U.S. Pat. No. 3,501,307, British Pat. No. 723,019, British Pat. No. 1,027,146. The Journal of Photographic Science, Vol. 12, pp. 242–251 (1963), ibid., Vol. 13, pp. 85–89, and ibid., Vol. 13, pp. 98–107.

There are no specific limitations on the conditions for carrying out the chemical ripening procedure for the silver halide emulsion prepared by the process of the present invention, for instance, pH, pAg, temperature, period and additives. For these purposes, the conditions generally employed in the art to which the present invention belongs are adopted. The pH value, for instance, ranges from 3.0 to 8.5, and preferably ranges from 5.0 to 7.5; the pAg value, for instance, ranges from 7.0 to 9.5, and preferably ranges from 8.0 to 9.3; the temperature, for instance, ranges from 40° to 85° C., and preferably ranges from 45° to 75° C.; and the period, for instance, ranges from 10 to 200 min., and preferably ranges from 30 to 120 min.

The silver halide emulsion prepared by the process of the present invention can be sensitized with a conventionally employed chemical sensitizing agent such as a sulfur sensitizer, a reduction sensitizer, or a noble metal sensitizer.

To the emulsion obtained upon the chemical aging procedure is added an additive that is named "coating finals" in a field of art to which the present invention belongs, and the so obtained mixture is coated on a variety of supports and dried to prepare a light-sensitive silver halide photographic material.

For the purposes of increase of sensitivity, increase of contrast and acceleration of developing process, variety of compounds can be added to the silver halide emulsion prepared by the process of the present invention.

For the purposes of inhibition of fogs appearing on a light-sensitive material in the courses of preparation, storage or photographic processing or for the purpose of stabilization of the photographic performance, a variety of compounds such as an antifoggant and a stabilizer can be also included.

The above-mentioned protective colloid employed for the production of silver halide can also be used as a binding agent or a protective colloid for preparing a light-sensitive material which is prepared according to the process of the present invention.

Into a photographic emulsion layer or other hydrophilic colloidal layers of the light-sensitive material prepared according to the process of the present invention, a variety of known surface active agents can be incorporated for a variety of purposes such as assisting the coating procedure, improving the slidability, providing emulsifiability and dispersibility, preventing adhesion and improving photographic characteristics such as acceleration of developing process, provision of high contrast and improvement of sensitization.

The emulsion prepared according to the process of the present invention can be spectrally sensitized with a methine dye or other dyes. Examples of the dyes to be employed include a cyanine dye, a merocyanine dye, a complex cyanine dye, a complex merocyanine dye, a holopolar cyanine dye, a hemi-cyanine dye, a styryl dye and a hemioxonol dye. Particularly useful dyes are those belonging to the merocyanine dye or the complex merocyanine dye.

The photographic emulsion prepared according to the process of the present invention may include a dye-image forming coupler, that is, a compound capable of reacting with an oxidation product in an aromatic amine developing agent (generally, it is a primary amine) to form a dye; this compound being referred to, hereinbefore, as "coupler". The coupler preferably is a non-diffusible one that contains a hydrophobic group called a ballast group, in the molecular structure. The coupler may have equivalency number of two or four to a silver ion. The photographic emulsion may include colored coupler that provides color correction or a coupler that releases a development inhibitor with the advance of development (so-called "DIR coupler"). The coupler may be one that yields colorless product upon coupling reaction.

The photographic emulsion prepared according to the process of the present invention is coated on a flexible support such as a plastic material film, paper or cloth, or a rigid support such as glass, ceramics or metal, which is generally employed for preparing a light-sensitive photographic material, through the dipping coating method, the roller coating method, the curtain coating method and the extruding coating method. The support may be colored with a dye or a pigment and may be made black for the purpose of preventing light. The surface of the support is generally under-coated so that the adhesion to the photographic emulsion layer can be improved.

Exposing process for obtaining a photographic image on a light-sensitive material prepared by the application of the silver halide emulsion produced according to the process of the present invention can be carried out in a conventional way. For that purpose, a variety of known light sources can be employed.

Photographic processing of a photosensitive material prepared by the application of the silver halide emulsion produced according to the process of the present invention can be carried out in any of known ways. A processing solution can be selected from known processing solutions. A processing temperature generally ranges from 18° to 50° C., but a temperature lower than 18° C.

or higher than 50° C. can be also utilized. The photosensitive material can be subjected either to the black-and-white photographic processing for forming a silver image or to the color photographic processing for forming a dye image, according to a purpose as desired.

A developing solution to be employed for the black-and-white photographic processing can contain a known developing agent. Examples of the developing agent include dihydroxybenzenes such as hydroquinone, 3-pyrazolidones such as 1-phenyl-3-pyrazolidone, aminophenols such as N-methyl-p-aminophenol, 1-phenyl-3-pyrazolines, ascorbic acid, etc. The solution can be employed alone or in combination. The developing solution may also contain known preservative, alkaline agent, pH buffering agent, anti-foggant, etc.

A fixing agent is composed of a generally adopted composition.

Examples of a fixing agent include an organic sulfur compound that is known as being effective as a fixing agent, as well as thiosulfate and thiocyanate.

The fixing agent may contain a water-soluble aluminum salt for serving as a hardening agent.

A color developing solution generally consists of an aqueous alkaline solution containing a color developing agent. The color developing agent may be a known primary aromatic amine developing agent such as a phenylenediamine.

Upon color development, a photographic emulsion layer is generally subjected to a bleaching treatment. The bleaching treatment can be carried out separately or simultaneously with a fixing treatment.

The effects provided by the present invention are set forth below.

(1) A silver halide emulsion containing monodispersed silver halide grains consisting essentially of silver iodobromide containing a high concentration (in the range of 15-40 mole %) of silver iodide distributed homogeneously both in the grains and between the grains can be obtained.

(2) The use of the epitaxial composite silver halide crystals as the host crystals for a silver halide emulsion as described above improves the developing speed, fixing speed, etc., as compared with the case using a known silver iodide emulsion.

(3) When a silver iodobromide emulsion having the characteristics described in the preceding item, which is prepared according to the process of the present invention, is employed for the preparation of the surface latent image type silver halide grains with no fog in the case using a light-sensitive photographic material comprising a silver halide emulsion layer in which the internal latent image type silver halide grains with fog and the surface latent image type silver halide grains with fog are present adjacent to each other, the fog is improved and the contrast and sensitivity are more enhanced.

(4) The interimage effect and edge effect can be effectively controlled by employing both of a silver iodobromide containing homogeneously a high concentration of silver iodide prepared according to the process of the present invention and a silver iodobromide emulsion containing a conventional amount of silver iodide formed together or separately into a layer or layers, respectively on a support.

The present invention is further illustrated by the following examples, but these examples are not understood to limit the present invention.

EXAMPLE 1

A monodispersed silver iodide emulsion was prepared employing the three solutions set forth in Table 1.

TABLE 1

| Solution A | Ossein gelatin | 100.0 g. |
|---|---|---|
| | Distilled water | 3.0 l. |
| | KI | 2.23 g. |
| | Temperature | 35° C. |
| | pH | 6.0 |
| Solution B | 5 molar aqueous solution of KI | 1,000 ml. |
| Solution C | 5 molar aqueous solution of AgNO$_3$ | 800 ml. |

An iodine ion electrode and a double-junction type silver/silver chloride reference electrode (junction solution: 1 molar KNO$_3$ aqueous solution) sold on the market were immersed in Solution A to measure the potential. The potential ($-175$ mV) was maintained during addition of Solutions B and C by adjusting the flow rate of Solution B.

Solution C was added at a constant flow rate of 0.5 ml./min. during the initial 6 min. period, and subsequently the flow rate was elevated straight forwardly by a rate of 0.385 ml./min. per every 10 min. The complete addition of Solution C required 197 min., and the temperature of the solution was kept at 35° C. during the physical aging procedure. When the addition of Solution C was complete, the addition was discontinued. Subsequently, washing with water and desalting were carried out in the following manner.

A precipitant (5% aqueous solution of Demol N, produced by Kao Atlas Co., Ltd., Japan) and an aqueous solution of magnesium sulphate (20%) were added in a ratio of 10:9 until a precipitate was produced. The precipitate was sedimented upon allowing to stand quietly, and then the supernatant liquid was removed by decantation. To the sedimented precipitate was added 3,000 ml. of distilled water to disperse again the precipitate. An aqueous solution of magnesium sulfate (20%) was further added to the so obtained disperse system until a precipitate was again produced. After sedimentation of the precipitate was complete, the supernatant liquid was removed by decantation. The aqueous solution of ossein gelatin containing 56.6 g. of gelatin was added to the precipitate, and the precipitate was dispersed under stirring at 35° C. for 20 min. Then, distilled water was so added to the disperse system to make the total volume to be 2,270 ml. The so obtained emulsion is referred to hereinafter as EM-1. The mean diameter of the grains contained in the EM-1 emulsion and the standard deviation of the granular diameter were confirmed to be 0.25 μm and 20% of the mean granular diameter respectively upon observation of the electron microscope photograph. Moreover, the X-ray diffraction analysis indicated that the EM-1 emulsion consisted substantially of β-phase silver iodide with little amounts of those of α- and γ-phases.

EXAMPLE 2

A monodispersed silver iodobromide emulsion containing 30 mole % of AgI was prepared employing the three solutions set forth in Table 2.

TABLE 2

| Solution D | Ossein gelatin | 5 g. |
|---|---|---|
| | Distilled water | 500 ml. |

TABLE 2-continued

| | | | |
|---|---|---|---|
| Solution E | Ethanolic aqueous solution of sodium salt of polyisopropylenepolyethyleneoxy-disuccinate (10%) | 1.5 | ml. |
| | Temperature | 50° C. | |
| | pH | 6.0 | |
| | Ossein gelatin | 20 | g. |
| | KI | 49.8 | g. |
| | KBr | 84.0 | g. |
| | Ethanolic solution of sodium salt of polyisopropyleneoxy-polyethyleneoxy-disuccinate (10%) | 6.0 | ml. |
| | Add distilled water to make | 1,000 | ml. |
| Solution F | 1 molar aqueous solution of AgNO$_3$ | 800 | ml. |

A silver ion electrode and a double-junction type saturated silver/silver chloride reference electrode (junction solution: 1 molar KNO$_3$ aqueous solution) sold on the market were immersed in Solution D to measure the potential. Solutions E and F were added to Solution D under adjustment of a flow rate of Solution E to maintain the potential constantly at +218 mV during the addition of Solutions E and F. The addition speed of Solution F was varied as described in Example 1. The temperature of the solution was kept at 50° C. during the physical aging procedure. When the addition of Solution F was complete, the addition was discontinued. Subsequently, washing with water and desalting were carried out in the following manner.

A precipitant (5% aqueous solution of Demol N, produced by Kao Atlas Co., Ltd., Japan) and an aqueous solution of magnesium sulfate (20%) were added in a ratio of 10:9 until a precipitate was produced. The precipitate was sedimented upon allowing to stand quietly, and then the supernatant liquid was removed by decantation. To the sedimented precipitate was added 1,600 ml. of distilled water to disperse again the precipitate. An aqueous solution of magnesium sulfate (20%) was further added to the so obtained disperse system until a precipitate was again produced. After sedimentation of the precipitate was complete, the supernatant liquid was then removed by decantation. An aqueous solution of ossein gelatin containing 12 g. of gelatin was added to the precipitate, and the precipitate was dispersed under stirring at 35° C. for 20 min. The total volume was then adjusted to 445 ml. by adding distilled water. The so obtained emulsion is referred to hereinafter as EM-2. The electronmicroscope photograph of the EM-2 emulsion indicated that the mean diameter of the grains contained in the EM-2 emulsion and the standard deviation of the granular diameter were confirmed to be 0.24 μm and 19% of the main granular diameter respectively. Moreover, the X-ray diffraction analysis indicated that the EM-2 emulsion comprised a homogeneous phase of silver iodobromide containing 30 mole % of AgI.

EXAMPLE 3

A silver iodobromide emulsion containing 40 mole % of AgI was prepared employing the three solutions set forth in Table 3.

TABLE 3

| | | | |
|---|---|---|---|
| Solution D' | Ossein gelatin | 5 | g. |
| | Distilled water | 500 | ml. |
| | Ethanolic aqueous solution of sodium salt of polyisopropylenepolyethyleneoxy-disuccinate (10%) | 1.5 | ml. |
| | Temperature | 60° C. | |
| | pH | 2.0 | |
| Solution E' | Ossein gelatin | 20 | g. |
| | KI | 66.4 | g. |
| | KBr | 72.0 | g. |
| | Ethanolic solution of sodium salt of polyisopropyleneoxy-polyethyleneoxy-disuccinate (10%) | 6.0 | ml. |
| | Add distilled water to make | 1,000 | ml. |
| Solution F' | 1 molar aqueous solution AgNO$_3$ | 800 | ml. |

Solutions E' and F' were added to Solution D', maintaining the pAg value constantly at 3.0 (potential: +404 mV) in the same manner as described in Example 2. The temperature of the solution was kept at 60° C. during the physical aging procedure. After the addition was complete, the washing with water and desalting were carried out in the same manner as described in Example 2. Then the obtained precipitate was again dispersed in the same gelatin solution as in Example 2. The so obtained emulsion is referred to hereinafter as EM-3. The electron-microscope photograph indicated that the EM-3 emulsion was a monodispersed emulsion, and the X-ray diffraction analysis indicated that the emulsion comprised a homogeneous phase of silver iodobromide containing 40 mole % of AgI.

EXAMPLE 4

A monodispersed silver iodobromide emulsion containing 40 mole % of AgI was prepared employing the three solutions set forth in Table 4.

TABLE 4

| | | | |
|---|---|---|---|
| Solution D" | Ossein gelatin | 5 | g. |
| | Distilled water | 500 | ml. |
| | AgNO$_3$ | 0.85 | g. |
| | Ethanolic solution of sodium salt of poly propyleneoxy-polyethylene oxy-disuccinate (10%) | 1.5 | ml. |
| | Temperature | 35° C. | |
| | pH | 6.0 | |
| Solution E" | Ossein gelatin | 20 | g. |
| | KI | 66.4 | g. |
| | KBr | 72.0 | g. |
| | Ethanolic solution of sodium salt of polyisopropyleneoxy-polyethyleneoxy-disuccinate (10%) | 6.0 | ml. |
| | Add distilled water to make | 1,000 | ml. |
| Solution F" | 1 molar aqueous solution of AgNO$_3$ | | |

Solutions E" and F" were added to Solution D", maintaining the potential of Solution of +470 mV in the same manner as described in Example 2. The temperature of the solution was kept at 35° C. during the physical aging procedure. After the addition was complete, the washing with water and desalting were carried out in the same manner as described in Example 2. Then, the obtained precipitate was again dispersed in a gelatin solution. The so obtained emulsion is referred to hereinafter as EM-4.

The electron-microscope photograph of the EM-4 emulsion indicated that the mean granular diameter was 0.46 μm and that the standard deviation of the granular diameter was 20% of the mean granular diameter, and the X-ray diffraction analysis indicated that the EM-4 emulsion comprised a homogeneous phase of silver iodobromide containing 40 mole % of AgI.

EXAMPLE 5

A silver iodobromide emulsion containing 40 mole % of AgI was prepared employing the three solutions set forth in Table 5.

TABLE 5

| Solution G | Ossein gelatin | 5 g. |
| --- | --- | --- |
| | Distilled water | 500 ml. |
| | Ethanolic solution of sodium salt of poly propyleneoxy-polyethylene oxy-disuccinate (10%) | 1.5 ml. |
| | Temperature | 60° C. |
| | pH | 2.0 |
| Solution H | Ossein gelatin | 20 g. |
| | KI | 66.4 g. |
| | KBr | 72.0 g. |
| | Ethanolic solution of sodium salt of polyiso-propyleneoxy-polyethyleneoxy-disuccinate (10%) | 6.0 ml. |
| | Add distilled water to make | 1,000 ml. |
| Solution I | 1 molar aqueous solution of AgNO$_3$ | |

Solutions H and I were added to Solution G, maintaining the pAg value of Solution G at 8 (potential: +73 mV) in the same manner as described in Example 2. The temperature of the solution was kept at 60° C. during the physical aging procedure. After the addition was complete, the washing with water and desalting were carried out in the same manner as described in Example 2. Then, the obtained precipitate was again dispersed in a gelatin solution. The so obtained emulsion is referred to hereinafter as EM-5.

The electron-microscope photograph indicated that the EM-5 emulsion was a monodispersed emulsion, and the X-ray diffraction analysis indicated that the EM-5 emulsion comprised a homogeneous phase of silver iodobromide containing 40 mole % of AgI.

EXAMPLE 6

A silver iodobromide emulsion containing 40 mole % of AgI was prepared employing the three solutions set forth in Table 5 shown in Example 5.

Solutions H and I were added to Solution G, maintaining the pAg value of Solution G at 10 (potential: −59 mV) in the same manner as described in Example 2. The temperature of the solution was kept at 60° C. during the physical aging procedure. After the addition was complete, the washing with water and desalting were carried out in the same manner as described in Example 2. Then, the obtained precipitate was again dispersed in a gelatin solution. The so obtained emulsion is referred to hereinafter as EM-6.

The electron-microscope photograph indicated that the EM-6 emulsion was an emulsion having grains in a wide granular diameter range, and the x-ray diffraction analysis indicated that the EM-6 emulsion comprised silver iodobromide grains in which the AgI contents were not even for the grains.

EXAMPLE 7

A silver iodobromide emulsion containing 20 mole % of AgI was prepared employing the three solutions set forth in Table 6.

TABLE 6

| Solution J | Ossein gelatin | 5 g. |
| --- | --- | --- |
| | Distilled water | 500 ml. |
| | Ethanolic solution of sodium salt of polypropyleneoxy-polyethyleneoxy-disuccinate (10%) | 1.5 ml. |
| | Temperature | 60° C. |
| | pH | 2.0 |
| Solution K | Ossein gelatin | 20 g. |
| | KI | 33.2 g. |
| | KBr | 84.0 g. |
| | Ethanolic solution of sodium salt of polyiso-propyleneoxy-polyethyleneoxy-disuccinate (10%) | 6.0 ml. |
| | Add distilled water to make | 1,000 ml. |
| Solution L | 1 molar aqueous solution of AgNO$_3$ | |

Solutions K and L were added to Solution J, maintaining the pAg value of Solution J at 3 (potential: +404 mV) in the same manner as described in Example 2. The solution was kept at 60° C. and the pH value at 2 during the physical aging procedure. After the addition was complete, the washing with water and desalting were carried out in the same manner as described in Example 2. Then, the obtained precipitate was again dispersed in a gelatin solution. The so obtained emulsion is referred to hereinafter as EM-7.

The electron-microscope photographn indicated that the EM-7 emulsion was a monodispersed emulsion, and the X-ray diffraction analysis indicated that the EM-7 emulsion comprised a homogeneous phase of silver iodobromide containing 20 mole % of AgI.

EXAMPLE 8

A silver iodobromide emulsion containing 20 mole % of AgI was prepared employing the three solutions set forth in Table 6 shown in Example 7.

Solutions K and L were added to Solution J, maintaining the pAg value of Solution J constantly at 10 (potential: −59 mV) [potential (+470 mV)] in the same manner as described in Example 2. The solution was kept at 60° C. and the pH value at 2 during the physical aging procedure. After the addition was complete, the washing with water and desalting were carried out in the same manner as described in Example 2. Then, the obtained precipitate was again dispersed in a gelatin solution. The so obtained emulsion is referred to hereinafter as EM-8.

The electron-microscope photograph indicated that the EM-8 emulsion was an emulsion having grains in a wide granular diameter range, and the X-ray diffraction analysis indicated that the EM-8 emulsion comprised silver iodobromide grains in which the AgI contents were not even for the grains.

The mean granular diameters and extents of granular diameter distribution calculated in the following equation (I) are set forth in Table 7 for EM-3, EM-5 and EM-6 emulsions prepared as hereinbefore.

$$\text{Extent of granular diameter distribution (\%)} = \frac{\text{Standard deviation of granular diameter distribution}}{\text{Mean granular diameter}} \times 100$$

Figure 2:
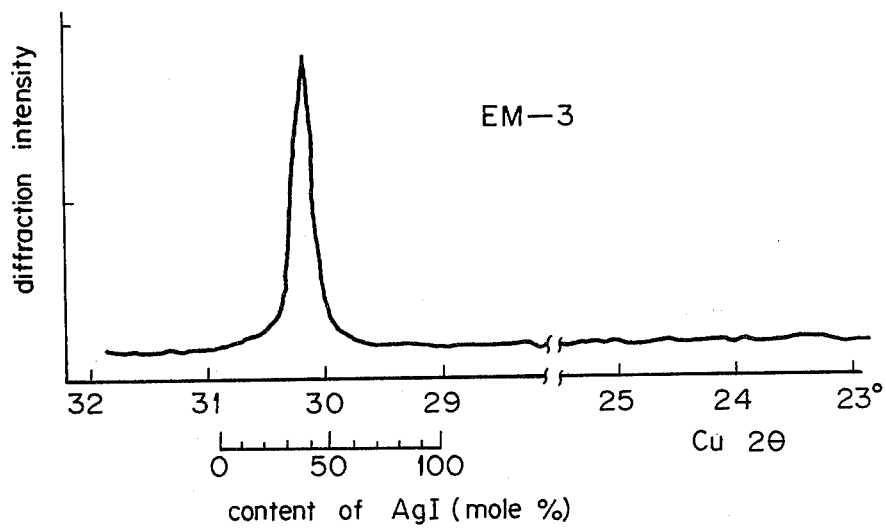
Figure 2:
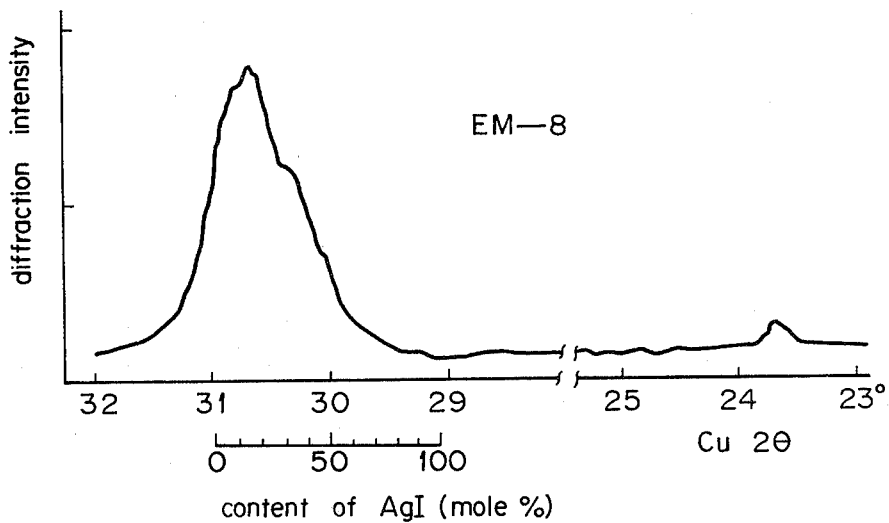

The granular diameter distribution curves and X-ray diffraction analysis data are illustrated in FIGS. 1 and 2 for EM-3, EM-5 and EM-6.

TABLE 7

|      | Mean granular diameter (μm) | Extent of distribution (%) |
|------|------|------|
| EM-3 | 0.286 | 32 |
| EM-5 | 0.140 | 20 |
| EM-6 | 0.516 | 87 |

FIG. 1 shows the granular diameter distribution curves for these emulsions calculated from the electron-microscope photographic data, and the horizontal axis and the vertical axis indicate a diameter [μm] along a definite direction and a relative frequency of numbers of grains belonging to a certain granular diameter range, respectively.

FIG. 2 shows the distributions of halogen compositions of these emulsions calculated from the X-ray diffraction analysis data. The distribution of halogen composition is calculated from lattice constants determined based on diffraction angles observed on the X-ray diffraction data. The calculation procedures are disclosed in, for instance, "The Theory of the photographic Processes", edited by James, the 4th edition, Macmillan Publishing, New York, (1977), page 4. The horizontal axis indicates an angle ($2\theta$) observed when K$\alpha$-ray of copper was employed as the X-ray, and a halogen composition corresponding to the angle ($2\theta$). The vertical axis indicates a diffraction strength corresponding to a specified angle.

EXAMPLE 9

An emulsion set forth in Table 8 which had not yet been chemically sensitized was coated on a film support so that gelatin and silver were coated thereon in the amounts of 4.00 g./m$^2$ and 0.5 g./m$^2$, respectively and so that pAg and pH reached 7.5 and 6.0, respectively. The so prepared samples are referred to hereinafter as Samples 1, 2 and 3. The sample was exposed to white light through an optical wedge in a KS-1 type Sensitometer (manufactured by Konishiroku Photo. Ind. Co., Ltd., Japan), and then treated in the following developing solution at 20° C. and for 10 min.

| Developing solution | |
|---|---|
| Metol | 6 g. |
| Sodium sulfite (anhydrous) | 50 g. |
| Hydroquinone | 6 g. |
| Sodium carbonate | 29.5 g. |
| Potassium bromide | 1.0 g. |
| Add water to make | 1 liter |

The results obtained upon sensitometry are set forth in Table 8.

TABLE 8

| Sample No. | EM No. | Relative sensitivity | Gamma | $D_{min.}$ | $D_{max.}$ |
|---|---|---|---|---|---|
| 1 | EM-1 | NO | NO | 0.03 | 0.08 |
| 2 | EM-2 | NO | NO | 0.03 | 0.09 |
| 3 | EM-4 | NO | NO | 0.03 | 0.08 |

As seen from the data set forth in Table 8, it is apparent that the EM-2 and EM-4 emulsions in which the silver halide grains consisted of silver halide crystals employing composite silver halide crystals of the present invention as the host crystals show extremely low photographic reaction, at a similar level as shown by the reference emulsion EM-1.

EXAMPLE 10

Four emulsions in which silver halide prepared by growing epitaxially pure silver chlorides on the silver iodobromides EM-1, 2, 3 and 5 obtained in Examples 1, 2, 3 and 5 were contained, were prepared employing three solutions set forth in Table 9.

TABLE 9

| Solution M | 1 molar aqueous solution of AgNO$_3$ | |
|---|---|---|
| Solution N | 1 molar aqueous solution of KCl | |
| Solution O | Ossein gelatin | 4.4 g. |
| | KCl | 1.0 g. |
| | Emulsion (EM-1, 2, 3 or 5) | 160 ml. |
| | Distilled water | 840 ml. |

Solution O were added simultaneously 70.6 ml. of Solution N and 70.6 ml. of Solution M at 35° C. and over 6 min., by the double jet method. After the addition was complete, washing with water and desalting were carried out in the following manner. A precipitant (5% aqueous solution of Demol N, produced by Kao Atlas Co., Ltd., Japan) and an aqueous solution of magnesium sulfate (20%) were added in a ratio of 10:9 until a precipitate was produced. The precipitate was sedimented upon allowing to stand quietly, and then the supernatant liquid was removed by decantation. To the sedimented precipitate was added 800 ml. of distilled water to disperse again the precipitate. An aqueous solution of magnesium sulfate (20%) was further added to the so obtained dispersion until a precipitate was again produced. After sedimentation of the precipitate was complete, the supernatant liquid was removed by decantation. The aqueous solution of ossein gelatin containing 10 g. of gelatin was added to the precipitate, and the precipitate was dispersed under stirring at 35° C. for 20 min. Then, distilled water was so added to the dispersion to make the total volume to be 200 ml. The so obtained emulsion is referred to hereinafter as EM-9, EM-10, EM-11 and EM-12.

EXAMPLE 11

An emulsion in which silver halide prepared by growing epitaxially pure silver bromide on the silver iodobromide obtained in Example 4 was prepared employing three solutions set forth in Table 10.

TABLE 10

| Solution P | Same as Solution M in Example 10 | |
|---|---|---|
| Solution Q | 1 molar aqueous solution of KBr | |
| Solution R | Ossein gelatin | 4.4 g. |
| | KBr | 1.0 g. |
| | EM-2 emulsion | 160 ml. |
| | Distilled water | 840 ml. |

To Solution R were added simultaneously 70.6 ml. of Solution P and 70.6 ml. of Solution Q at 35° C. and over 6 min. by the double-jet method. After the addition was complete, the washing with water, desalting and redispersing were carried out in the same manner as described in Example 10. The so obtained emulsion is referred to hereinafter as EM-13.

EXAMPLE 12

An emulsion in which silver halide prepared by growing epitaxially silver iodobromide (AgI content: 6 mole %) on the silver iodobromide obtained in Example 4 was contained was prepared employing three solutions set forth in Table 11.

TABLE 11

| | | |
|---|---|---|
| Solution S | Same as Solution M of Example 10 | |
| Solution T | KBr | 115.2 g. |
| | KI | 10.0 g. |
| | Distilled water | 1,000 ml. |
| Solution U | Ossein gelatin | 4.4 g. |
| | KBr | 1.0 g. |
| | EM-2 emulsion | 160 ml. |
| | Distilled water | 840 ml. |

To Solution U were added simultaneously 70.6 ml. of Solution S and 70.6 ml. of Solution T at 35° C. and over 6 min. After the addition was completed, the washing with water, desalting and redispersing were carried out in the same manner as described in Example 10. The so obtained emulsion is referred to hereinafter as EM-14.

EXAMPLE 13

An emulsion in which silver halide prepared by growing epitaxially pure silver chloride on the pure silver iodide obtained in Example 1 was contained was prepared employing three solutions set forth in Table 12.

TABLE 12

| | | |
|---|---|---|
| Solution V | Same as Solution M of Example 11 | |
| Solution W | Same as Solution N of Example 11 | |
| Solution X | Ossein gelatin | 4.4 g. |
| | KCl | 1.0 g. |
| | EM-1 emulsion | 160 ml. |
| | Distilled water | 840 ml. |

To Solution X were added simultaneously 70.6 ml. of Solution V and 70.6 ml. of Solution W at 35° C. and over 6 min. After the addition was complete, the washing with water, desalting and redispersing were carried out in the same manner as described in Example 10. The so obtained emulsion is referred to hereinafter as EM-15.

EXAMPLE 14

To 200 ml. of an emulsion prepared in the same manner as described in Example 13 were added, in advance of subjecting to desalting procedure, 65 ml. of 1 molar aqueous solution of KBr and 4.2 ml. of 1 molar aqueous solution of KI. The resulting mixture was heated at 50° C. for 10 min. so as to convert the silver chloride combined epitaxially, by bromine and iodine. Then, the washing with water and desalting were carried out in the same manner as described in Example 13. The so obtained emulsion is referred to hereinafter as EM-16.

EXAMPLE 15

To each of the silver halide emulsions of EM-9, EM-10, EM-11, EM-12, EM-13, EM-14, EM-15 and EM-16 was added $2.0\times10^{-8}$ mole of sodium thiosulfate and $1.0\times10^{-3}$ mole of sodium chloroaurate, both being based on mole of silver, and the mixture was stirred at 45° C. for 60 min. Subsequently, to the resulting mixture were added 4-hydroxy-6-methyl-1,3,3a,7-tetraazaindene and 1-phenyl-5-mercaptotetrazole, and bis(vinylsulfonylmethyl) ether and saponin were further added thereto just prior to being coated. The mixture was then coated on a support so that silver and gelatin were coated thereon in the amounts of 3.0 g./m² and 2.0 g./m², respectively. Thus, samples (Samples Nos. 4–11) were prepared. The sample was exposed to white light through an optical wedge in a KS-1 type Sensitometer (manufactured by Konishiroku Photo. Ind. Co., Ltd., Japan), and then treated in the same developing solution as described in Example 9 at 20° C. and for 10 min. The results are set forth in Table 13.

TABLE 13

| Sample No. | EM No. | Relative sensitivity | Gamma | $D_{min.}$ | $D_{max.}$ |
|---|---|---|---|---|---|
| 5 | EM-10 | 140 | 0.75 | 0.03 | 1.20 |
| 6 | EM-11 | 140 | 0.75 | 0.03 | 1.20 |
| 7 | EM-12 | 138 | 0.73 | 0.03 | 1.20 |
| 8 | EM-13 | 138 | 0.73 | 0.03 | 1.20 |
| 9 | EM-14 | 135 | 0.73 | 0.03 | 1.20 |
| 4 | EM-9 | 95 | 0.26 | 0.03 | 0.50 |
| 10 | EM-15 | 100 | 0.28 | 0.03 | 0.50 |
| 11 | EM-16 | 95 | 0.26 | 0.03 | 0.50 |

Note:
Relative sensitivity was determined at $D_{min.} + 0.10$.

As seen from the data set forth in Table 13, it is apparent that the EM-10, EM-11, EM-12, EM-13, and EM-14 emulsions (Samples No. 5, No. 6, No. 7, No. 8 and No. 9) according to the present invention are higher in the sensitivity, Gamma and $D_{max.}$, more satisfactory in the photographic performance, and faster in the developing speed than the EM-9, EM-15 and EM-16 emulsions (samples No. 4, No. 10 and No. 11) in which the base crystals are made of silver iodide.

EXAMPLE 16

The same samples as described in Example 15 were fixed in the fixing solution having the following formulation. The fixing time (period required for reaching a transparent state) was determined. The results are set forth in Table 14.

| Formulation of fixing solution | |
|---|---|
| Sodium thiosulfate | 200 g. |
| Sodium sulfite (anhydrous) | 10 g. |
| Disodium hydrogenphosphate | 15 g. |
| Add water to make (pH 8.2, 26° C.) | 1 liter |

TABLE 14

| Sample No. | EM No. | Fixing time (period required for reaching a transparent state) | |
|---|---|---|---|
| 5 | EM-10 | 1 min. | 30 sec. |
| 6 | EM-11 | 1 | 30 |
| 7 | EM-12 | 1 | 30 |
| 8 | EM-13 | 1 | 30 |
| 9 | EM-14 | 1 | 30 |
| 4 | EM-9 | 4 | 37 |
| 10 | EM-15 | 4 | 37 |
| 11 | EM-16 | 4 | 50 |

As seen from the data set forth in Table 14, it is apparent that the emulsions according to the present invention are prominently improved in the fixing speed, as compared with the reference EM-9, EM-15 and EM-16 emulsions.

EXAMPLE 17

The EM-10, EM-13, EM-14, EM-15 and EM-16 emulsions were sensitized chemically, as in Example 15 and, after addition of $3\times10^{-4}$ mole of the following sensitizing dye (I) and $3.5\times10^{-4}$ mole of the following sensitizing dye (II), based on mole of silver, the emulsions were subjected to spectral sensitization.

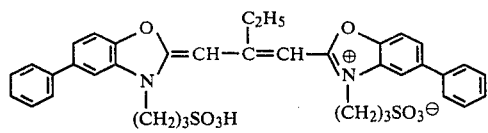

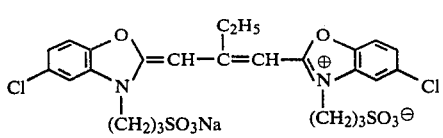

To the so sensitized emulsion were added 4-hydroxy-6-methyl-1,3,3a,7-tetraazaindene and 1-phenyl-5-mercapto tetrazole. Further added was an emulsion of 50 g. of 1-(2,4,6-trichlorophenyl)-3-[3-(2,4-di-t-aminophenoxyacetamido)benzamido]-5-pyrazolone, 10 g. of 1-(2,4,6-trichlorophenyl)-4-(1-naphthylazo)-3-(2-chloro-5-octadecenylsuccinimidanilino)-5-pyrazolone and 1.5 g. of 2-(1-phenyl-5-tetrazolylthio)-4-octadecylsuccinimid-1-indanone in 60 g. of tricresyl phosphate. The resulting emulsion was so coated on a support consisting of a transparent cellulose triacetate base with substratum layer that the amount of silver was 14 g./m². The so prepared sample was then subjected to wedge exposure through yellow filter in the same manner as described in Example 15 and developed in the manner set forth below.

| Developing process Process (at 37.8° C.) | Processing time |
|---|---|
| Color developing | 3 min. 15 sec. |
| Bleaching | 6 min. 30 sec. |
| Washing with water | 3 min. 15 sec. |
| Fixing | 6 min. 30 sec. |
| Washing with water | 3 min. 15 sec. |
| Stabilizing | 1 min. 30 sec. |
| Drying | |

Treating solutions employed in each of the above-described processes had the following compositions.

| Color developing solution | |
|---|---|
| 4-Amino-3-methyl-N-ethyl-N-(β-hydroxyethyl)-aniline sulfate | 4.8 g. |
| Sodium sulfite (anhydrous) | 0.14 g. |
| Hydroxylamine.½ sulfate | 1.98 g. |
| Sulfuric acid | 0.74 g. |
| Potassium carbonate (anhydrous) | 28.85 g. |
| Potassium hydrogen carbonate (anhydrous) | 3.46 g. |
| Potassium sulfite (anhydrous) | 5.10 g. |
| Potassium bromide | 1.16 g. |
| Trisodium nitrotriacetate (monohydrate) | 1.20 g. |
| Potassium hydroxide | 1.48 g. |
| Add water to make | one liter |

| Bleaching solution | |
|---|---|
| Ammonium iron ethylenediamine-tetraacetate | 100.0 g. |
| Diammonium ethylenediamine-tetraacetate | 10.0 g. |
| Ammonium bromide | 150.0 g. |
| Glacial acetic acid | 10.0 ml. |
| Add water to make | one liter |
| Add aqueous ammonium to adjust | pH 6.0 |

| Fixing solution | |
|---|---|
| Ammonium thiosulfate | 175.0 g. |
| Sodium sulfite (anhydrous) | 8.6 g. |
| Sodium methasulfite | 2.3 g. |
| Add water to make | one liter |
| Add acetic acid to adjust | pH 6.0 |

| Stabilizing solution | |
|---|---|
| Formalin | 1.5 ml. |
| Konidax (manufactured by Konishiroku Photo. Ind. Co., Ltd., Japan) | 7.5 ml. |
| Add water to make | on liter |

The results obtained upon sensitometry are set forth in Table 15.

TABLE 15

| Sample No. | EM No. | $D_{min.}$ | Relative sensitivity | Gamma | $D_{max.}$ |
|---|---|---|---|---|---|
| 12 | EM-10 | 0.06 | 130 | 0.85 | 2.50 |
| 13 | EM-13 | 0.06 | 123 | 0.84 | 2.48 |
| 14 | EM-14 | 0.06 | 120 | 0.83 | 2.47 |
| 15 | EM-15 | 0.06 | 100 | 0.59 | 1.50 |
| 16 | EM-16 | 0.06 | 95 | 0.57 | 1.40 |

These results show that the emulsions according to the present invention give excellent developing speeds even in the application to the color photographic process.

EXAMPLE 18

This example shows results given by application of emulsions of the present invention to an image forming process utilizing a metal salt and physical development nuclei.

Preparation of a silver halide light-sensitive (high sensitive) emulsion

A silver iodobromide emulsion containing 7 mole % of silver iodide was prepared by a conventional neutral method using silver nitrate, sodium bromide and potassium iodide. The emulsion was then subjected to the second aging process through a gold-sulfur sensitizing method, and an appropriate amount of 4-hydroxy-6-methyl-1,3,3a,7-tetraazaindene serving as a stabilizer was added to the emulsion, giving a high sensitive silver iodobromide emulsion. The so obtained emulsion is referred to hereinafter as EM-17.

Preparation of an emulsion containing easily soluble metal salt grains (substantially non-light-sensitive silver halide)

A pure silver chloride emulsion was prepared by a conventional neutral method using silver nitrate and sodium chloride. The emulsion was then washed by a precipitation method, and 1-phenyl-5-mercaptotetrazole which would serve as an insolubilizing agent in the amount of 0.6 g. per 1 mole of silver chloride was added to the washed emulsion, giving an emulsion.

Silver chloride grains contained in the so obtained emulsion had an mean granular diameter of about 0.1 micron.

Preparation of physical development nuclei

Physical development nuclei containing silver sulfide were prepared in aqueous gelatin solution using sodium sulfide and silver nitrate.

The so obtained physical development nuclei were added to the emulsion contining easily soluble silver chloride that had been previously prepared as above, and subsequently an appropriate amount of saponin serving as a coating aid was added to the mixture. The so obtained mixture was homogeneously coated over a polyester base with substratum layer.

In the above procedure, silver contained in the silver chloride emulsion was coated in the amount of 2.1 g./m$^2$, silver contained in the physical development nuclei was coated in the amount of 0.01 g./m$^2$, and the gelatin was coated in the amount of 3 g./m$^2$.

An appropriate amount of 2-ethylhexyl succinate-sodium monosulfate serving as a coating aid was added to the previously prepared silver iodobromide light-sensitive emulsion EM-17, and the resulting mixture was then homogeneously coated on the layer prepared as above, to give the coating amounts of 2.0 g./m$^2$ for silver and 3 g./m$^2$ for gelatin.

Further, 2.5% aqueous gelatin solution containing an appropriate amount of a film hardening agent (formalin) and a coating aid (the same compound as above) was repeatedly coated on the above-prepared layers to form a protective layer. Thus, a photosensitive material was obtained (Sample No. 17).

The same procedures as above were repeated except that the silver iodobromide photosensitive emulsion EM-17 was replaced with the EM-11 emulsion, that is according to the present invention and that had been prepared by combining pure silver chloride with a silver iodobromide (high iodo concentration) emulsion through epitaxial junction. Thus, Sample No. 18 was prepared.

The so prepared film piece was exposed to light of 3.2 CMS through wedge, and then developed at 35° C. for 30 sec. in a developing solution consisting of the compositions set forth below. The piece was subsequently fixed, washed with water, and dried, and subjected to sensitometry.

| Composition of developing solutions | |
| --- | --- |
| Hydroquinone | 12.0 g. |
| Sodium sulfite (anhydrous) | 65.0 g. |
| Phenidone | 1.0 g. |
| Potassium hydroxide | 15.0 g. |
| Sodium thiosulfate (5 hydrates) | 2.0 g. |
| Potassium bromide | 0.2 g. |
| Add water to make | one liter |

The results are set forth in Table 16

TABLE 16

| Sample No. | Photosensitive silver iodobromide | Relative sensitivity | Maximum density | Gamma | Fog |
| --- | --- | --- | --- | --- | --- |
| 17 | EM-17 | 100 | 2.4 | 2.0 | 0.05 |
| 18 | EM-11 | 140 | 2.9 | 2.6 | 0.05 |

Note:
EM-17 and EM-11 emulsions are according to a conventional silver iodobromide and the emulsion of the present invention, respectively.

As seen from the data set forth in Table 16, the employment of the emulsion according to the present invention provides an image with a high maximum density and a high gamma. Thus, the amount of silver to be required can be saved.

We claim:

1. A photographic silver halide emulsion which comprises composite silver halide crystals consisting essentially of multi-faceted silver iodobromide crystals containing 15–40 mole % of silver iodide and silver halide crystals containing not more than 10 mole % of silver iodide, said silver halide crystals being combined as epitaxial silver halide crystals with said multi-faceted silver iodobromide crystals through epitaxial junction, at least half of the facetes of said multi-faceted silver iodobromide crystals being substantially free of said epitaxial silver halide crystals, and the amount of said epitaxial silver halide being limited to not more than 75 mole % based on the total silver halide forming said composite silver halide crystals.

2. A photographic silver halide emulsion as claimed in claim 1 wherein said multi-faceted silver iodobromide contains 20–40 mole % of silver iodide and said epitaxial silver halide contains not more than 8 mole % of silver iodide.

3. A photographic silver halide emulsion as claimed in claim 1 wherein the amount of said epitaxial silver halide is in the range of 1–50 mole % based on the total silver halide forming said composite silver halide crystals.

4. A photographic silver halide emulsion as claimed in claim 1, 2 or 3 wherein the mean granular diameter of said multi-faceted silver iodobromide crystals is at least 0.2μ.

5. A process for preparing a silver halide emulsion comprising silver grains consisting essentially of silver iodobromide containing 15–40 mole % of silver iodide which comprises producing the silver halide by simultaneous addition of (i) a solution comprising a water-soluble bromide and a water-soluble iodide and (ii) a solution containing a water-soluble silver salt, to a solution containing a protective colloid in a simultaneous mixing way and by keeping the pAg of the solution in the range of 1–8 during the period of the production of the silver halide, the amount of the iodide ion in said water-soluble iodide being 15–40 mole percent of the silver ion in said water-soluble silver salt.

6. A process for preparing a silver halide emulsion as claimed in claim 5 wherein the amount of said protective colloid is in the range of about 0.5–100 g. per one liter of the emulsion containing the formed silver halide.

7. A process for preparing a silver halide emulsion as claimed in claim 5 wherein said pAg of the solution is in the range of 2–7.

8. A process for preparing a silver halide emulsion as claimed in claim 5 wherein the pH of the solution is in the range of about 2–9.

9. A process for preparing a silver halide emulsion as claimed in claim 8 wherein the pH of the solution is in the range of about 2–5.

10. A process for preparing a silver halide emulsion as claimed in claim 5 wherein the precipitation of the silver halide is carried out at a temperature of around 30°–90° C.

11. A process for preparing a silver halide emulsion as claimed in claim 10 wherein the production of the silver halide is carried out at a temperature of around 35°–80° C.

* * * * *

UNITED STATES PATENT AND TRADEMARK OFFICE
CERTIFICATE OF CORRECTION

PATENT NO. : 4,349,622

DATED : September 14, 1982

INVENTOR(S) : Takeo Koitabashi et al

It is certified that error appears in the above-identified patent and that said Letters Patent is hereby corrected as shown below:

Column 19, Below Table 8, Between lines 60 and 62, insert -- Note: Relative sensitivity was determinded at $D_{min}$ + 0.10. No means that the determination was not able to be carried out.--

Signed and Sealed this

Twenty-eighth Day of August 1984

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,349,622
DATED : September 14, 1982
INVENTOR(S) : Takeo Koitabashi et al It is certified that error appears in the above-identified patent and that said Letters Patent is hereby corrected as shown below:

Column 19, Below Table 8, Between lines 60 and 62, insert -- Note: Relative sensitivity was determined at $D_{min}$ + 0.10. No means that the determination was not able to be carried out. --

This certificate supersedes certificate of correction issued August 28, 1984.

Signed and Sealed this

Twenty-second Day of October 1985

[SEAL]

Attest:

Attesting Officer

DONALD J. QUIGG

*Commissioner of Patents and Trademarks—Designate*